Aug. 24, 1965  F. M. BURDITT  3,202,289

STAND FOR BICYCLES AND THE LIKE

Filed July 1, 1963

INVENTOR.
FREDERIC M. BURDITT
BY

ATTORNEYS

United States Patent Office 3,202,289
Patented Aug. 24, 1965

3,202,289
STAND FOR BICYCLES AND THE LIKE
Frederic M. Burditt, 127 Coolidge Hill, Cambridge, Mass.
Filed July 1, 1963, Ser. No. 291,983
9 Claims. (Cl. 211—22)

My invention relates to stands for maintaining upright a bicycle or the like.

An object of my invention is to provide means for maintaining in an upright position vehicles such as bicycles, motorcycles, scooters, and other vehicles which are not stable or capable of sustaining themselves in an upright position without bracing or other support. For convenience, such vehicles will be generally referred to as bicycles.

Another object is to provide a stand which is adaptable for accommodating bicycles having wheels of different widths or tire sizes, as for example, bicycles having narrow tires and also bicycles having balloon size tires.

Another object is the provision for readily and quickly clamping in position a bicycle wheel, usually the front wheel of the bicycle, so as to hold the bicycle in an upright position.

Another object is the provision for maintaining bicycles in an orderly and conveniently arranged pattern.

Another object is the provision for quick insertion and removal of a bicycle from the stand while at the same time assuring adequate and proper support of the bicycle by the stand.

Another object is the provision for clamping a front wheel of a bicycle by a simple and easily manipulated device so as to assure proper upright support of the bicycle while leaving the bicycle readily accessible for removal.

Other objects and a fuller understanding of my invention may be had by referring to the following description and claims, taken in conjunction with the accompanying drawing, in which:

Figure 1:
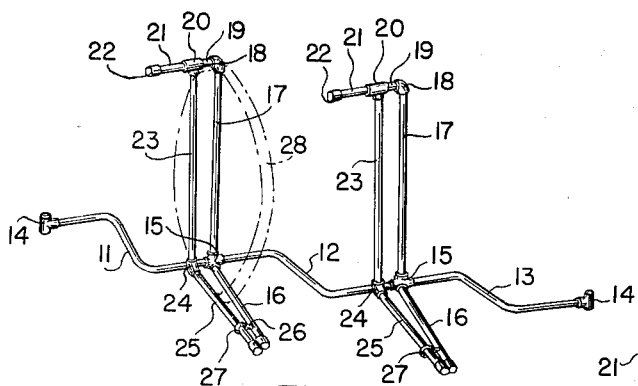
FIGURE 1 is a perspective view of a bicycle stand embodying my invention illustrating two units interconnected, that is, parts for holding two bicycles.

A bicycle stand embodying my invention may be made up of any number of units arranged in a row. For purposes of illustration only, there is shown in FIGURE 1 two units interconnected in a desired arrangement and which will accommodate two bicycles. It is to be understood, of course, that the invention may be incorporated in a single unit stand for one bicycle or in a stand having any multiple of units for a plurality of bicycles.

My bicycle stand has a base portion made up of Z-shaped members interconnected. In the case of the two-unit stand shown in FIGURE 1, the base is composed of Z-shaped members 11, 12 and 13. In the case of the single unit stand shown in the other figures, the base member is made up of Z-shaped members 11 and 12. The terminal member 14 may be secured to the outer free ends of the Z-shaped base members. If desired, pins or bolts may be inserted through the vertical openings in the terminal members 14. If the stand is mounted upon ground or dirt, such pins may be driven into the ground to secure the stand in place. On another supporting surface, such as a floor, bolts or screws may be inserted through the vertical openings in the terminal members 14 shown as T-couplings, and screwed or otherwise secured to the floor. For purposes of simplicity, the invention will be described in connection with a single unit stand, such as shown in FIGURES 2, 3, 4 and 5.

Interconnecting the base members 11 and 12 is a four-way coupling 15. This coupling 15 secures adjacent ends of members 11 and 12 in alignment. Connected to the four-way coupling 15 is a lower horizontal member 16 of an L-shaped stationary part of the unit. The member 16 is supported on the floor or other ground surface and is disposed generally at right angles to the adjacent portions of members 11 and 12 secured to the coupling 15. Also connected to the four-way coupling 15 is an upright member 17 of the said L-shaped stationary part of the unit. Members 16 and 17 are disposed at substantially right angles to each other. Base members 11 and 12, horizontal member 16, and upright member 17 all interconnected by the coupling 15 together comprise a stationary part or fixed standard of my device.

Mounted upon the upper end of the upright member 17 is a right-angle coupling 18 so connected therewith that it may swing on a pivot concentric with the axis of the member 17. This coupling 18 provides a first pivot action in the operation of my device. Secured to the other end of the coupling 18 is a horizontally disposed cross-member 19 of relatively short length as illustrated. Secured to the other end of the cross-member is a T-coupling 20. Connected to the other end of the T-coupling 20 in alignment with the short cross-member 19 is an arm 21, so that members 19 and 21 together comprise an arm or assembled cross-member swingable in an arc about the axis of upright member 17. An end-piece 22 encloses the free end of the arm 21.

Connected to the lower end and vertically directed branch of the T-coupling 20 is an upright member 23. This upright member 23 is a part of a movable L-shaped part of my device. The interconnection of upright member 23 and T-coupling 20 is such that a second pivot action is provided. In other words, the upright member 23 may rotate on its axis relative to the T-coupling 20 as the coupling 20 is swung in an arc with the cross-arm (made up of pieces 19 and 21) about the axis of the fixed upright member 17. Thus, a second pivot action is provided by the interconnection of the coupling 20 with the upright member 23.

Secured to the bottom end of the upright member 23 and supported thereby is a right-angle coupling 24. The interconnection of the coupling 24 with the upright member 23 is such that the upright member 23 may rotate on its axis as the coupling 24 is swung in an arc around the axis of the fixed member 17. Thus the interconnection of the upright member 23 and the right-angle coupling 24 provides a third pivot action in the device. A lower horizontal member 25 is connected to the other end of the coupling 24 so as to extend it at substantially right anges to the upright member 23. Members 23 and 25 together provide an L-shaped movable part.

Mounted to the fixed horizontal member 16 near its rearward or free end is an eye-bolt 26. This eye-bolt 26 extends at right angles to the member 16 and is slightly inclined from the horizontal so that the large annulus portion 27 of the eye-bolt 26 is raised slightly from the level of member 16. The inner diameter of the large annulus 27 of the eye-bolt 26 is such that the member 25 may freely side along its length relative to the annulus 27. Also the internal diameter is sufficiently large that the member 25 may angularly swing to some degree relative to the annulus 27, that is, so its angular disposition to the fixed member 16 may vary. As seen in the drawing, the angle coupling 24 and member 25 are held up sufficiently from the horizontal supporting surface upon which the members 11, 12 and 16 rest so that the member 25 may freely move without interference from contact with the floor or other supporting surface. A good sliding engagement is provided between the member 25 and annulus 27 so that the member 25 may have a compound movement in both sliding along its length and in swinging angularly relative to the fixed member 16.

For purposes of simplicity of illustration, only the front wheel of a bicycle has been shown, but it will be understood that this front wheel shown in broken lines and denoted by the reference character 28 is assembled with and is part of a complete bicycle or the like.

Figure 3:
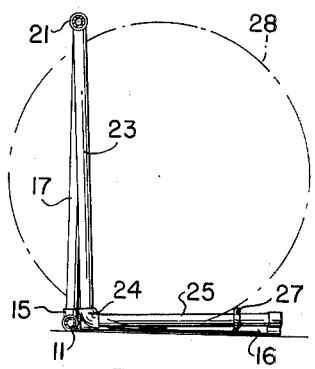
FIGURE 3 is a side elevational view of a single unit stand and is taken through the line 3—3 of FIGURE 2.
Figure 2:
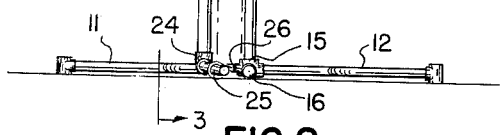
FIGURE 2 is an elevational view of a single unit bicycle stand embodying my invention and showing the bicycle wheel in dotted lines in position in the stand.
Figure 4:
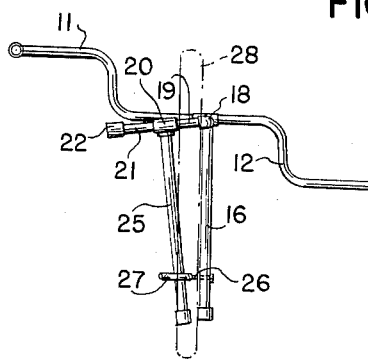
FIGURE 4 is a plan view looking down on the single unit bicycle stand shown in FIGURES 2 and 3, and showing the clamping portions swung partially from its unclamped position shown in FIGURE 2.
Figure 5:
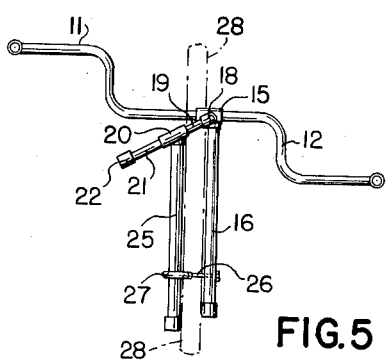
FIGURE 5 is a plan view looking on the single unit bicycle stand shown in FIGURES 2 and 3, and showing the clamping portion swung further into a complete clamping position.

In the usual use of my device, the cross-member (made up of parts 19 and 21 interconnected with coupling 20) is swung so that this cross-member is in the unclamped position shown in FIGURES 1, 2 and 3. That is, so that the cross-piece is substantially parallel with aligned adjacent portions of members 11 and 12 secured to coupling 15. When the stand is in this open position, a bicycle may be moved so as to position the front wheel 28 between the upright members 17 and 23 by reason of the spacing between the members 17 and 23. A bicycle wheel of usual maximum width or balloon tires may be readily accommodated between the members 17 and 23. The lower portion of the bicycle wheel directly below its axis is positioned between members 16 and 25 approximately midway between member 11 where it joins the coupling 15 and the eye-bolt 26. The bottom of the bicycle wheel at this point preferably is supported upon the ground or other floor surface between members 16 and 25 but it may rest on the members 16 and 25 along their oppositely facing surfaces. In this position, the bicycle wheel 28 is substantially as shown in broken lines in FIGURES 1, 2 and 3. As seen in FIGURE 2, there is leeway or space between the bicycle wheel and the upright portions of the L-shaped parts of the stand. After the bicycle wheel has been thus positioned, the user or operator seizes the end of the cross-member, near the end-piece 22, and swings it rearwardly (toward the bottom of the drawing in FIGS. 4 and 5). The parts first swing to the position shown in FIGURE 4, and upon progressively swinging the cross-member further, the parts move sufficiently to clamp the wheel, that is, to the position shown in FIGURE 5. As seen in FIGURE 5, the wheel 28 is now firmly clamped between the upright members 17 and 23 and between the horizontal members 16 and 25. The three pivot actions described permit the cross-member to swing in an arc about the axis of the upright member 17 and permit the member 25 to move longitudinally to the position shown in FIGURE 5. In this movement, the axis of the upright member 23 swings in an arc about the axis of the upright member 17. The pivot actions at the opposite ends of the member 23 permit the swiveling of the upright member 23 as the cross-member is swung in an arc as described and as the lower member 25 is moved lengthwise and swung from its angular position shown in FIGURE 2 to its substantially parallel position (parallel to 16) shown in FIGURE 5. Thus the compound movement is effected so as to provide a clamping action to bring the movable L-shaped members (23 and 25) against the stationary L-shaped members (17 and 16). Of course, the wheel is unclamped by swinging the cross-piece in the opposite direction, that is, by seizing the cross-piece 22 and swinging it from its position shown in FIGURE 5 progressively through the position shown in FIGURE 4 to the position shown in FIGURES 1, 2 and 3. The wheel is then unclamped and may be readily removed from the stand.

In the form of the device illustrated, the several parts 11, 12, 13, 16, 17, 19, 21, 23 and 25 are pieces of pipe. Also couplings 15, 18, 20 and 24 are pipe couplings. The pieces of pipe and couplings are threadably interconnected in the usual manner. The interconnection between pipe 17 and coupling 18 is such as to permit a limited pivot action as described. The interconnection between the coupling 20 and member 23 is also such as to permit the limited pivot action as described. Also the interconnection between the pipe 23 and coupling 24 is such as to permit the pivot action as described. The several pivot actions thus permit such swiveling of the parts as to provide swinging action for the clamping operation above described.

It is to be understood that the device may be made of other material and parts, as for example, welded tubing and other structural members, with the further understanding that the required swivel movement would be provided by pivoted interconnections where required and as above described.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of the construction and the combination and arrangement of parts may be resorted to without departing from the spirit and scope of the invention as hereinafter claimed.

What is claimed is:

1. A stand for holding upright a cycle having a wheel to be embraced on the side thereof, said wheel being positionable in an upright reference plane at a fixed angle to said stand, comprising in combination, a base member, a first upright member supported by the base member and extending upwardly therefrom and adapted to engage a first side of a said wheel, a second upright member disposed substantially parallel to said first upright member and at a distance therefrom, and a cross-member pivotally connected to said first upright member and carrying said second upright member to swing said second upright member in an arc about the axis of the first upright member upon the swinging of said cross-member about the first upright member, the said second upright member upon being swung in said arc being variously spaced from said upright reference plane to permit a said wheel to be positioned in said upright reference plane and intermediate said first and second upright members and to be clamped between said upright members in said upright reference plane upon the swinging of said second upright member by said cross-member toward said upright reference plane.

2. A stand as claimed in claim 1 and including coupling means coupling said second upright member and said base member at a distance from said cross-member to accommodate the swinging of the said second upright member relative to said base and to maintain the second upright member at a distance from said first upright member in the path of said arc.

3. A stand for holding a bicycle and the like in an upright position, comprising in combination, a base member, a first L-shaped member having an upright portion and a generally horizontal portion carried by the base member in relatively fixed position and disposed generally in a plane parallel to an upright reference plane, a second L-shaped member having an upright portion and a generally horizontal portion disposed generally in a plane parallel to said upright reference plane, a cross-member pivotally connected to the upright portion of the first L-shaped member and pivotally connected at a distance therefrom to the upright portion of the second L-shaped member to provide for swinging the upright portion of the second L-shaped member in an arc about the axis of the upright portion of the first L-shaped member, pivotal connecting means interconnecting the upright portion and the generally horizontal portion of the second L-shaped member to permit the generally horizontal portion thereof to be maintained generally in said plane parallel to said upright reference plane, and coupling means coupling the generally horizontal portions of said first and second L-shaped members at a distance from said pivotal connecting means and arranged to permit the generally horizontal portion of the second L-shaped member to move substantially in said plane parallel to said upright reference plane and relative to the generally horizontal portion of said first L-shaped member as the upright portion of the second L-shaped member is swung in said arc, whereby a wheel of a bicycle or the like may be positioned between said L-shaped members and clamped in position therebetween by the swinging of the upright portion of the second L-shaped member in said arc to move the second L-shaped member toward said upright reference plane.

4. A stand for a bicycle or the like having a wheel to be clamped in upright position comprising in combination, a first member mounted in fixed position, said first member having an upper portion adapted to engage a side of a forward segment of a said wheel and a lower portion adapted to engage a side of a lower segment of the said wheel, a second member having an upper portion adapted to engage the opposite side of said forward segment of the wheel and a lower portion adapted to engage the opposite side of said lower segment of the wheel, hinge means interconnecting the upper portions of the first and second members to permit the upper portion of the second member to be swung in an arc about an upright axis through the upper portion of the first member, and coupling means interconnecting the lower portions of the first and second members to permit the lower portion of the second member to move alongside of and toward and away from the lower portion of the first member as the upper portion of the second member is swung in said arc, whereby a wheel positioned between said members may be held in an upright position by swinging the upright portion of the second member in an arc toward said wheel.

5. In a bicycle stand, the combination of first means adapted to engage a first of the opposite sides of a wheel of the bicycle in an upright position at a location on the wheel adjacent the bottom and at a location upwardly of the bottom and forwardly on the wheel, second means adapted to engage a second of the opposite sides of said wheel adjacent said locations, third means interconnecting said first and second means to maintain them in spaced adjacent upright planes on opposite sides of the upright plane of said wheel, and fourth means for swinging said second means about the said first means while the same are maintained in spaced adjacent upright planes to clamp between said first and second means said wheel in an upright plane.

6. In combination, a support, a fixed standard carried by the support in an upright plane, the fixed standard being adapted to accommodate alongside the same an upright bicycle wheel and to engage a side of the same at spaced locations along its circumference, one of said locations being at a higher elevation than the other location, a clamping member disposed in an upright plane and adapted to engage adjacent said spaced locations the opposite side of a wheel accommodated alongside said fixed standard, and means interconnecting said clamping member and fixed standard to permit the clamping member to be swung in an upright plane toward the upright plane of said fixed standard to clamp a said wheel therebetween in an upright plane.

7. A stand for holding upright the wheel of a bicycle or the like comprising in combination, a base, a first upright standard carried by the base in relatively fixed position against which a first side of the forward portion of a wheel may be placed, an upright clamping member disposed substantially parallel to said upright standard and at a distance therefrom for accommodating a wheel in upright position between the standard and clamping member, an arm pivotally carried by said standard and connected to said clamping member for holding the clamping member at said distance and parallel to said standard, a handle extending from said arm for the swinging of said arm to move the clamping member in an arc about the axis of said standard, a pair of substantially parallel engaging members spaced from each other for accommodating therebetween a bottom portion of a wheel to hold the bottom portion of said wheel against lateral movement upon the movement of said clamping member against an opposite side of said forward portion of the wheel by the swinging of said arm in said arc, one engaging member being attached to and normal to said standard and the other engaging member being attached to and normal to said clamping member.

8. In a bicycle stand, the combination of a pair of parallel spaced upright members adapted to accommodate therebetween the forward portion of a bicycle wheel disposed in a reference upright plane, means interconnecting said upright members to permit one of the upright members to swing in an arc about the axis of the other of the upright members and toward and away from said reference upright plane, and means engageable by a side of the bottom portion of a said wheel at a distance from said forward portion for maintaining the wheel in said reference upright plane upon said one upright member being swung in said arc toward said reference upright plane and against said wheel to clamp the same in said reference upright plane.

9. A stand for holding upright the wheel of a bicycle or the like comprising in combination, a base, a first upright standard carried by the base in relatively fixed position against which a first side of the forward portion of a said wheel may be placed, an upright clamping member disposed substantially parallel to said upright standard and at a distance therefrom for accommodating a said wheel in upright position between the standard and clamping member, an arm pivotally carried by said standard and connected to said clamping member for holding the clamping member at said distance and parallel to said standard, handle means carried by said arm for the swinging of said arm to move the clamping member in an arc about the axis of said standard, and an engaging member extending from said base and in the general plane of said base for engaging a side of a bottom portion of said wheel to resist lateral movement of the bottom portion of said wheel upon the movement of said clamping member against an opposite side of said wheel by the swinging of said arm in said arc.

References Cited by the Examiner

UNITED STATES PATENTS

| 36,091 | 9/02 | Merritt. | |
| 590,443 | 9/97 | Temple | 211—21 |

FOREIGN PATENTS 130,054  12/27  Switzerland.

CLAUDE A. LE ROY, *Primary Examiner.*